(12) United States Patent
Shimomaki (10) Patent No.: US 8,174,656 B2
(45) Date of Patent: May 8, 2012

(54) LIQUID CRYSTAL DISPLAY DEVICE

(75) Inventor: Shinichi Shimomaki, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 316 days.

(21) Appl. No.: 12/581,165

(22) Filed: Oct. 19, 2009

(65) Prior Publication Data

US 2010/0103360 A1   Apr. 29, 2010

(30) Foreign Application Priority Data

Oct. 28, 2008   (JP) .................................. 2008-277372

(51) Int. Cl.
*G02F 1/1337* (2006.01)
(52) U.S. Cl. ...................................... 349/141
(58) Field of Classification Search ................... 349/141
See application file for complete search history.

(56) References Cited

U.S. PATENT DOCUMENTS

| | | | |
|---|---|---|---|
| 7,345,728 B2 | 3/2008 | Lee et al. | |
| 7,978,301 B2 * | 7/2011 | Takeda et al. | 349/168 |
| 8,004,643 B2 * | 8/2011 | Kobayashi | 349/141 |
| 8,031,313 B2 * | 10/2011 | Suzuki | 349/144 |
| 2005/0030461 A1 | 2/2005 | Ono et al. | |
| 2005/0068483 A1 | 3/2005 | Lee et al. | |
| 2005/0078260 A1 | 4/2005 | Ono et al. | |
| 2005/0078261 A1 | 4/2005 | Ono et al. | |
| 2005/0078262 A1 | 4/2005 | Ono et al. | |
| 2005/0083470 A1 | 4/2005 | Ono et al. | |
| 2005/0083471 A1 | 4/2005 | Ono et al. | |
| 2005/0225708 A1 | 10/2005 | Oke et al. | |
| 2008/0007666 A1 | 1/2008 | Takeda et al. | |

(Continued)

FOREIGN PATENT DOCUMENTS

CN   101101418 A   1/2008

(Continued)

OTHER PUBLICATIONS

Japanese Office Action in a counterpart application JP2008-277372 dated on Mar. 1, 2011.

(Continued)

*Primary Examiner* — James Dudek
(74) *Attorney, Agent, or Firm* — Chen Yoshimura LLP (57) ABSTRACT

A liquid crystal display device comprising: liquid crystal layer provided between a first substrate and a second substrate; first electrodes, which are formed above the first substrate as a first layer, each first electrode having a side which extends in the direction in parallel with the extending direction of data lines, each first electrode electrically connected to corresponding data line via corresponding switching device; and a second electrode, which is formed above the first substrate as a second layer, having a first slit and a second slit in each part of the area overlapping with corresponding first electrode; wherein the first slit has a first elongated portion extending in a direction inclining toward the extending direction of the side at a given angle, a second elongated portion extending in a direction inclining toward the extending direction of the side at an angle symmetrical to the given angle with respect to the first elongated portion, and a bent portion that connects the first elongated portion with the second elongated portion; and the second slit has a third elongated portion which is formed in parallel with the first elongated portion, and a fourth elongated portion which is formed in parallel with the second elongated portion and separated from the third elongated portion.

20 Claims, 5 Drawing Sheets

U.S. PATENT DOCUMENTS

| | | |
|---|---|---|
| 2008/0013028 A1 | 1/2008 | Ono et al. |
| 2008/0042158 A1 | 2/2008 | Oke et al. |
| 2008/0062371 A1 | 3/2008 | Ono et al. |
| 2009/0046234 A1* | 2/2009 | Tanaka .......................... 349/141 |
| 2009/0091697 A1 | 4/2009 | Ono et al. |
| 2009/0096974 A1 | 4/2009 | Ono et al. |
| 2009/0096979 A1 | 4/2009 | Ono et al. |
| 2009/0102826 A1 | 4/2009 | Oke et al. |
| 2009/0128764 A1 | 5/2009 | Ono et al. |
| 2009/0135326 A1 | 5/2009 | Ono et al. |
| 2010/0079712 A1* | 4/2010 | Tanaka et al. ................. 349/123 |

FOREIGN PATENT DOCUMENTS

| | | |
|---|---|---|
| JP | 2005-107535 A | 4/2005 |
| JP | 2005-300821 A | 10/2005 |
| JP | 2007-233317 A | 9/2007 |
| JP | 2008-33311 A | 2/2008 |
| KR | 20020041426 A | 6/2002 |
| WO | 01/18597 A1 | 3/2001 |
| WO | 2008/038432 A1 | 4/2008 |

OTHER PUBLICATIONS

Chinese Office Action dated Mar. 29, 2011, in counterpart application CN 200910207283.6.

Korean Office Action dated Mar. 25, 2011, in counterpart application KR 10-2009-0098522.

Japanese Office Action in counterpart application JP2008-277372 dated on Oct. 5, 2010.

* cited by examiner

LIQUID CRYSTAL DISPLAY DEVICE

This application is based upon and claims the benefit of priority from the prior Japanese Patent Application No. 2008-277372, filed Oct. 28, 2008, the entire contents of which are incorporated herein by reference.

BACKGROUND OF THE INVENTION

1. Field of the Invention

The present invention relates to a liquid crystal display device wherein liquid crystal molecules are aligned substantially in parallel with a substrate surface by rotation control.

2. Description of the Related Art

Liquid crystal display devices using an in-plane switching type are well known. A liquid crystal layer of these devices is provided between a pair of substrates placed opposite to each other at a given distance, ensuring that liquid crystal molecules are aligned substantially in parallel to a substrate surface, with their long axes aligned in a certain direction. On the internal surface of one of the substrate pair, pixel electrodes and a common electrode are formed, insulated from each other, to generate electric field. The electric field controls each liquid crystal molecule to align substantially in parallel to the substrate surface. For example, a thin-film transistor is placed in each region enclosed with top and bottom scanning lines and right and left data lines, a control electrode of the thin-film transistor is connected to a scanning line, an input electrode of the thin-film transistor is connected to a data line, and an output electrode of the thin-film transistor is connected to the pixel electrode. Data lines and pixel electrodes are formed on an interlevel insulating layer containing a gate insulating film. The common electrode is provided above pixel electrodes and the interlevel insulating layer via another interlevel insulating layer. The common electrode has a plurality of slits, namely openings penetrating in the thickness direction. The method of generating an in-plane electric field between the edge of each slit and the solid pixel electrode may be called the fringe field switching (FFS) method. In FFS method, a structure extending slits in parallel to a scanning line or data line and a dog-leg structure extending not in parallel to a scanning line or data line (FIG. 12 of JP2007-233317 and JP2005-107535) are known. With the latter, the electric field applied between the common electrode and the pixel electrode acts in the direction obliquely crossing the long axes of the liquid crystal molecules in the initial alignment state, aligning the direction of the liquid crystal in the initial alignment state and thus ensuring uniform brightness. In addition, this structure forms multiple domains that divide the alignment direction of liquid crystal molecules in one pixel, further expanding viewing angle, which is why this structure is often adopted.

In the liquid crystal display device having a non-parallel structure described above, the area enclosed with the top and bottom scanning lines and the left and right data lines is approximately in a rectangular shape, whereas the slits have the shape of a hanger or a dog leg, not a long rectangular shape extending in the column direction. Consequently, if slits are arranged on the common electrode in the column or row direction, there is some area on which hanger or dog-leg-shaped openings cannot be formed. Liquid crystal molecules existing in this area, namely a residual area, are relatively not affected by an in-plane electric field generated between the pixel electrode and the common electrode, and therefore do not contribute to display. As a result, not only transmittance from the back side to the front side of the liquid crystal display device but also aperture ratio itself decreases, which is a problem. The same problem arises when slits are formed linearly but not in parallel with the column or row direction.

SUMMARY OF THE INVENTION

A purpose of the present invention is to provide a liquid crystal display device with enhanced light transmittance per pixel.

One aspect of the present invention provides the liquid crystal display device comprising: a liquid crystal layer provided between a first substrate and a second substrate; first electrodes, which are formed above the first substrate as a first layer, each first electrode having a side which extends in the direction in parallel with the extending direction of data lines, each first electrode electrically connected to corresponding data line via corresponding switching device; and a second electrode, which is formed above the first substrate as a second layer, having a first slit and a second slit in each part of the area overlapping with corresponding first electrode; wherein the first slit has a first elongated portion extending in a direction inclining toward the extending direction of the side at a given angle, a second elongated portion extending in a direction inclining toward the extending direction of the side at an angle symmetrical to the given angle with respect to the first elongated portion, and a bent portion that connects the first elongated portion with the second elongated portion; and the second slit has a third elongated portion which is formed in parallel with the first elongated portion, and a fourth elongated portion which is formed in parallel with the second elongated portion and separated from the third elongated portion.

Another aspect of the present invention provides the liquid crystal display device comprising: a liquid crystal layer provided between a first substrate and a second substrate; pixel electrodes, which are formed above the first substrate as a first layer, each pixel electrode having a side which extends in the direction in parallel with the extending direction of data lines, each pixel electrode electrically connected to corresponding data line via corresponding thin film transistor; and a common electrode, which is formed above the first substrate as a second layer, having a first slit and a second slit in each part of the area overlapping with corresponding pixel electrode; wherein the first slit has a first elongated portion extending in a direction inclining toward the extending direction of the side at a given angle, a second elongated portion extending in a direction inclining toward the extending direction of the side at an angle symmetrical to the given angle with respect to the first elongated portion, and a bent portion that connects the first elongated portion with the second elongated portion; and the second slit has a third elongated portion which is formed in parallel with the first elongated portion, and a fourth elongated portion which is formed in parallel with the second elongated portion and separated from the third elongated portion.

Another aspect of the present invention provides the liquid crystal display device comprising: a liquid crystal layer provided between a first substrate and a second substrate, first electrodes, which are formed above the first substrate as a first layer, each first electrode having a side which extends in the direction in parallel with the extending direction of data lines, each first electrode electrically connected to corresponding data line via corresponding switching device; and a second electrode, which is formed above the first substrate as a second layer, having a first slit, a second slit, and a third slit in each part of the area overlapping with corresponding first electrode; wherein the first slit has a first elongated portion extending in a direction inclining toward the extending direction of the side at a given angle, a second elongated portion extending in a direction inclining toward the extending direction of the side at an angle symmetrical to the given angle with respect to the first elongated portion, and a first bent portion that connects the first elongated portion with the second elongated portion; and the second slit has a third elongated portion, which is formed in parallel with the first elongated portion and is shorter than the first elongated portion, and a fourth elongated portion, which is formed in parallel with the second elongated portion and is shorter than the second elongated portion, the fourth elongated portion separated from the third elongated portion; and the third slit has a fifth elongated portion, which is formed in parallel with the first elongated portion and is shorter than the first elongated portion, a sixth elongated portion, which is formed in parallel with the second elongated portion and is shorter than the second elongated portion, and a second bent portion that connects the fifth elongated portion with the sixth elongated portion.

A liquid crystal display device according to the present invention provides enhanced light transmittance by pixel.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE PREFERRED EMBODIMENTS

[First Embodiment]

Figure 1:
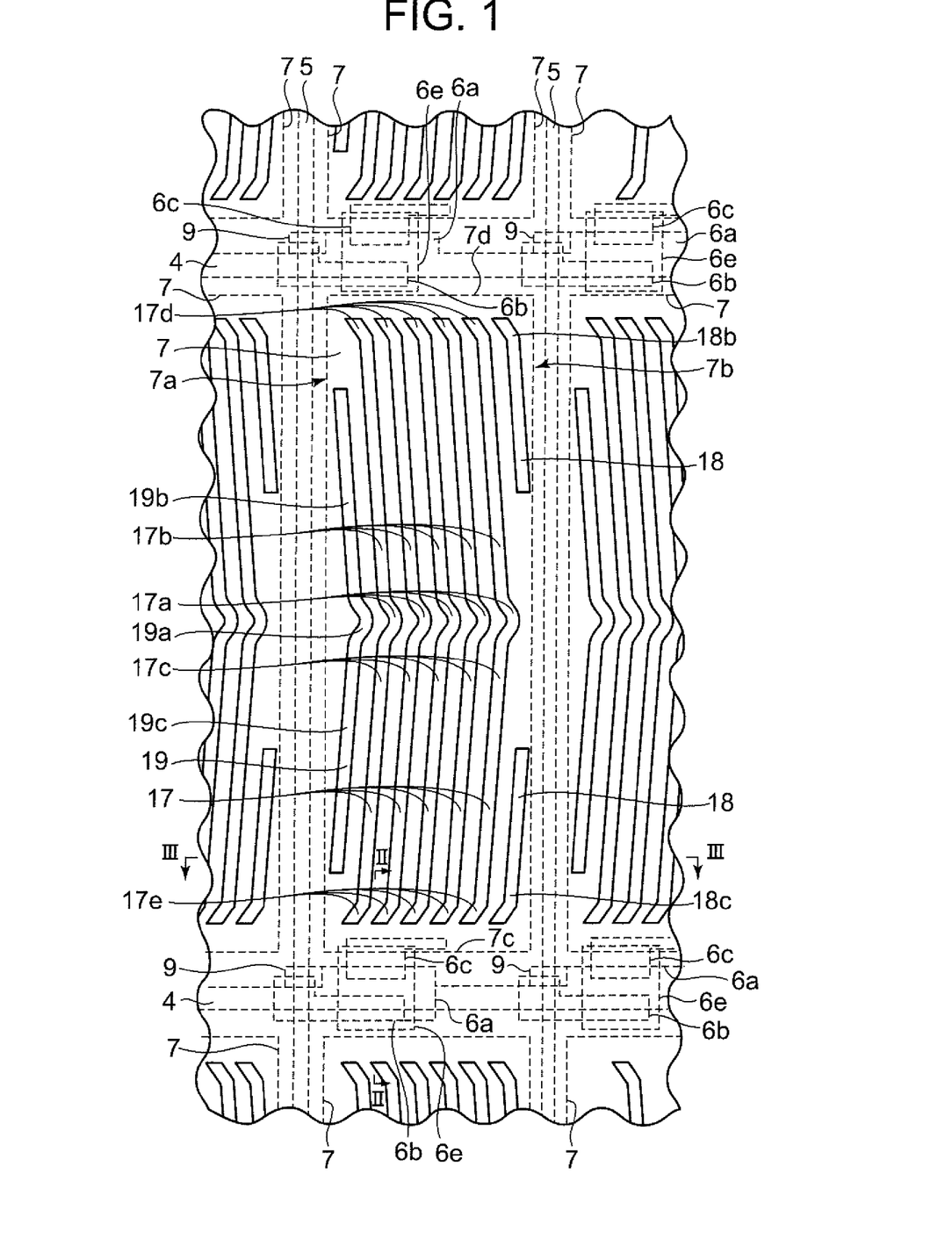
FIG. 1 is a plan view of a liquid crystal display device according to the first embodiment of the present invention.
Figure 2:
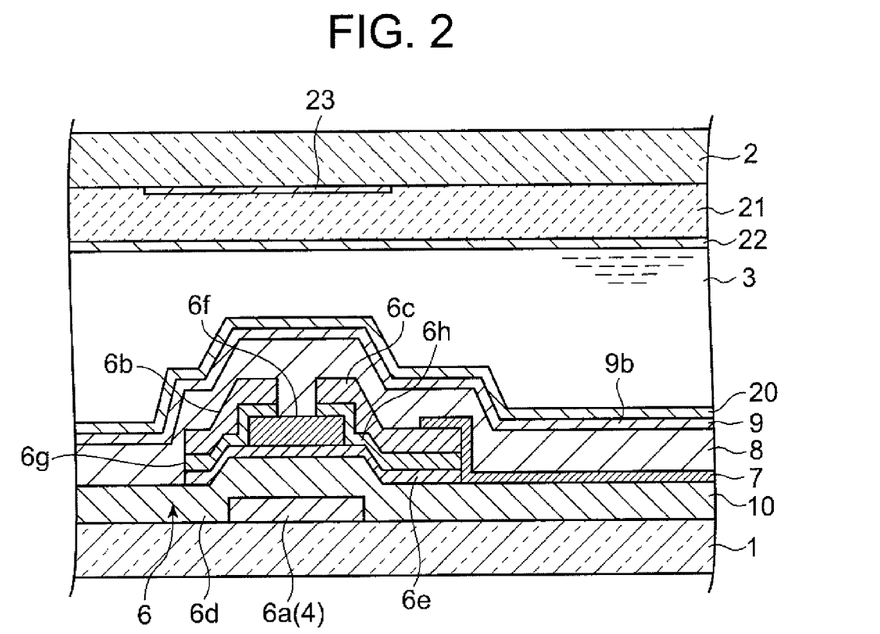
FIG. 2 is a cross-sectional view taken along the line of II-II of FIG. 1.
Figure 3:
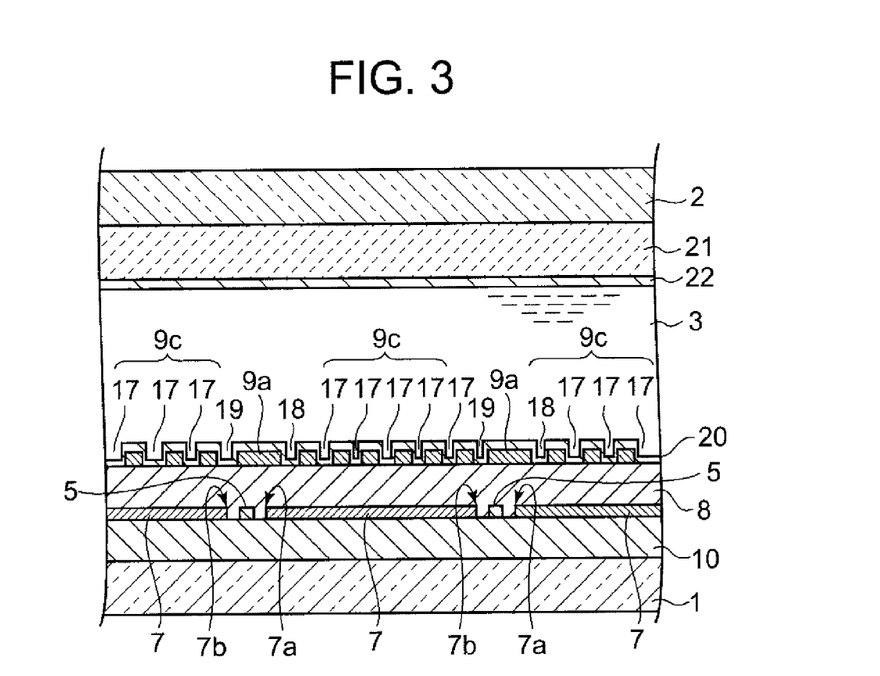
FIG. 3 is a cross-sectional view taken along the line of III-III of FIG. 1.

FIGS. 1 to 3 illustrate a first embodiment of the present invention. FIG. 1 is a plan view of the liquid crystal display device, FIG. 2 is a cross-sectional view of FIG. 1 along the line II-II, and FIG. 3 is a cross-sectional view of FIG. 1 along the line III-III.

A liquid crystal display device related to the first embodiment of the present invention includes a pair of substrates 1 and 2 placed opposite to each other at a certain distance, a liquid crystal layer 3 provided between the pair of substrates 1 and 2 in parallel with the substrate surface, with the long axes of liquid crystal molecules aligned in a specified direction, a plurality of scanning lines 4 extending in the row direction on the side of one of the substrate pair (on the side of the first substrate 1 in the figure), a plurality of data lines 5 extending in the column direction crossing the scanning lines 4 on the side of one of the substrate pair, a plurality of switching devices 6, each of which is provided in an area enclosed by the top and the bottom scanning lines 4 and the right and the left data lines 5 (referred to as "unit area" or "display pixel area"), a plurality of pixel electrodes 7, each of which is formed in each unit area and connected to a corresponding switching device 6, an interlevel insulating layer 8 formed on the pixel electrodes 7, data lines 5, and switching devices 6, and a common electrode 9 formed on the interlevel insulating layer 8 on the side of the liquid crystal layer 3.

Each switching device 6 has a gate electrode (control electrode) 6a, a source electrode (input electrode) 6b, and a drain electrode (output electrode) 6c in each area enclosed by the top and the bottom scanning lines 4 and the right and left data lines 5. The gate electrode 6a is connected to a corresponding scanning line 4, whereas the source electrode 6b is connected to a corresponding data line 5. A thin-film transistor (TFT) is used as a switching device 6, for example.

Each TFT 6 includes a gate insulating film 6d forming part of the insulating layer 10, which covers the entire surface of the first substrate 1 over a gate electrode 6a formed on the first substrates 1, an i-type semiconductor layer 6e formed on the gate insulating film 6d facing opposite to the gate electrode 6a, an etching stopper layer 6f for protecting the channel area of the i-type semiconductor layer 6e, ohmic contact layers 6g and 6h formed of n-type semiconductor facing opposite to each other and partially covering the etching stopper layer 6f, a source electrode 6b formed on one of the ohmic contact layers 6g, and a drain electrode 6c formed on the other ohmic contact layer 6h.

Each scanning line 4 is connected to the gate electrode 6a of each TFT 6 placed in a corresponding row. Each data line 5 is connected to the source electrode 6b of each TFT placed in a corresponding column.

Each pixel electrode 7, made of a transparent conductive film such as indium tin oxide (ITO) film, is formed on the insulating layer 10 in each of the rectangular-shaped unit area specified in advance, partially covering the drain electrode 6c of the TFT 6. The pixel electrode 7 has at least a side 7a or 7b that extends in the direction in parallel with the extending direction of the data lines 5.

The interlevel insulating layer 8 is formed, covering the pixel electrode 7, TFT 6, and data lines 5 over the entire surface, on the side of one of the substrates 1. A common electrode 9 is formed on this interlevel insulating layer 8. The interlevel insulating layer 8 may not be provided above the TFT 6. The pixel electrode 7 and the common electrode 9 are electrically insulated from each other.

The common electrode 9, made of a transparent conductive film for example ITO, has a vertical edge 9a that covers the left and the right edges 7a and 7b of the pixel electrode 7 and the data lines 5 via the interlevel insulating layer 8, extending over the adjacent unit areas, a horizontal edge 9b that covers the upper and the lower edges 7c and 7d of the pixel electrode 7 via the interlevel insulating layer 8, except for the area over the TFT 6, extending over the adjacent unit areas, and a main portion 9c that covers the pixel electrode 7 via the interlevel insulating layer 8. The main portion 9c has a plurality of first slits 17, a second slit 18, and a third slit 19. When a voltage is applied between the pixel electrode 7 and each edge of the first slits 17, the second slit 18, the third slit 19, the vertical edge 9a, and the horizontal edge 9b, a horizontal electric field is generated to control the alignment direction of each liquid crystal molecule of the liquid crystal layer 3.

Detailed description of the common electrode 9 will be given below. The common electrode has at least one first slit 17, second slit 18, and third slit 19. As shown in the figure, a plurality of other slits having the same shape as the first slit 17 are formed on the common electrode 9 in parallel to the first slit 17. In the following description, both the first slit 17 and other slits having the same shape as the first slit 17 are defined as the first slits 17.

A plurality of first slits 17, a pair of second slits 18, and a third slit 19 are formed on the common electrode 9.

Each of the first slits 17, having hanger-shaped, is provided to extend in the column direction and parallely arranged in the row direction. Specifically, each of the first slit 17 includes a bent portion 17a formed at the position closest to the right data line 5, an elongated portion 17b that extends obliquely upward from the bent portion 17a, and another elongated portion 17c that extends obliquely downward from the bent portion 17a. Both top and bottom edges of the elongated portions 17b and 17c are bent to form further slanted portions 17d and 17e. In other words, each of the first slits 17 is slanted not in parallel either to the scanning lines 4 or to the data lines 5.

The elongated portion 17c extends obliquely downward from the bent portion 17a, forming an angle with the extending direction of the data lines 5, which is the same as the angle formed between the elongated portion 17b, which extends upward from the bent portion 17a, and the data line 5.

The elongated portion 17c extending obliquely downward from the bent portion 17a has the same length as the elongated portion 17b extending obliquely upward from the bent portion 17a.

A second slit 18 is formed in an area of the main portion 9c in which the first slits 17 are not provided, in the area between the rightmost first slit 17, of all the first slits 17, and the right edge of the main portion 9c that is closest to the right data line 5 in the example shown in the figure. The second slit 18 has two subslits separated from each other. One of the two subslits is formed on the side of one of the two adjacent scanning lines 4, on the side of the upper scanning line 4 in the figure shown, and the other subslit is formed on the side of the other scanning line 4, on the side of the lower scanning line 4 in the figure shown. The second slit 18 has the same shape as a portion of the first slits 17, namely the shape of the elongated portions 17b and 17c, which does not include the bent portion 17a but include the further slanted portions 17d and 17e, respectively. The second slit 18 does not have a bent portion 17a included in the first slits 17. Of the two sub-slits, one is formed closer to one of the two adjacent scanning lines (on the side of the upper scanning line 4 in the figure shown), with the upper edge of the elongated portion 18b bent counterclockwise. The other sub-slit is formed closer to the other scanning line (on the side of the lower scanning line 4 in the figure shown), with the lower edge of the elongated portion 18c bent clockwise.

The third slit 19 is formed in an area of the main portion 9c where the first slits 17 are not provided, between the leftmost first slit 17 of all the first slits 17 and the left edge of the main portion 9c, which is close to the left data line 5, in the example shown in the figure. The third slit 19 has the same shape as a portion of the first slits 17 not including the further slanted portions, with the elongated portions 19b and 19c connected at the bent portion 19a. Specifically, the third slit 19 has the same shape as the first slits 17 except that the third slit 19 does not include the further slanted portions 17d and 17e.

As described above, in the first embodiment of the present invention, hanger-shaped first slits 17 extending in the column direction are arranged in the row direction. A second slit 18 having the identical shape as the top and the bottom portions of the hanger-shaped first slits 17 is formed on the right of the first slits 17, whereas a third slit 19 having the identical shape as a part of the hanger-shaped first slits 17, which is different from the shape of the second slit 18, is formed on the left of the first slits 17.

That is, the main portion 9c of the common electrode 9 includes a plurality of hanger-shaped first slits 17, second slit 18, which has the same shape as a portion of the first slits 17, including the top portion 17d and the bottom portion 17e but not including the bent portion 17a and a third slit 19, which has the same shape as a portion of the first slits 17, including the bent portion 17a but not extending as long as the top and the bottom portions 17d and 17e.

When a voltage is applied between the pixel electrode 7 and the common electrode 9, a horizontal electric field is generated in each gap between the first slits 17, the second slit 18 and the third slit 19 formed on the common electrode 9. This horizontal electric field causes each molecule in the liquid crystal layer 3 to rotate on the plane. Consequently, not only the molecules in the liquid crystal layer 3 on the first slits 17 but also those on the second slit 18 and the third slit 19 contribute to display, thus improving transmittance.

As described above, the pixel electrodes 7 have left and right edges 7a and 7b that linearly extend along the left and right data lines 5 and 5 on the same plane as the left and right data lines 5 and 5.

As shown in FIGS. 2 and 3, on the side of one of the substrates 1, an alignment layer 20 is formed, covering the common electrode 9 and the interlevel insulating layer 8, to align each liquid crystal molecule of the liquid crystal layer 3 in parallel with the substrate surface. A deflector 21 is provided under the other substrate 2, and then an alignment layer 22 is provided between the deflector 21 and the liquid crystal layer 3. A light shield layer 23 is provided in a specified area between the deflector 21 and the substrate 2 to cover the area where the switching device 6 is formed, thus preventing malfunction of the switching device 6.

In the first embodiment, each of the pixel electrode 7 and the common electrode 9 may be formed into a shape symmetrical to the one shown in FIG. 1. In this case, the third slit 19 is formed between the right data line 5 and the rightmost first slit 17. The second slit 18 is formed in an area enclosed by the left data line 5, the upper scanning line 4, and the leftmost first slit 17, and in an area enclosed by the left data line 5, the lower scanning line 4, and the leftmost first slit 17, respectively, separated from each other. In this case, the second slit 18 and the third slit 19 have a shape symmetrical to the one shown in FIG. 1.

Figure 4:
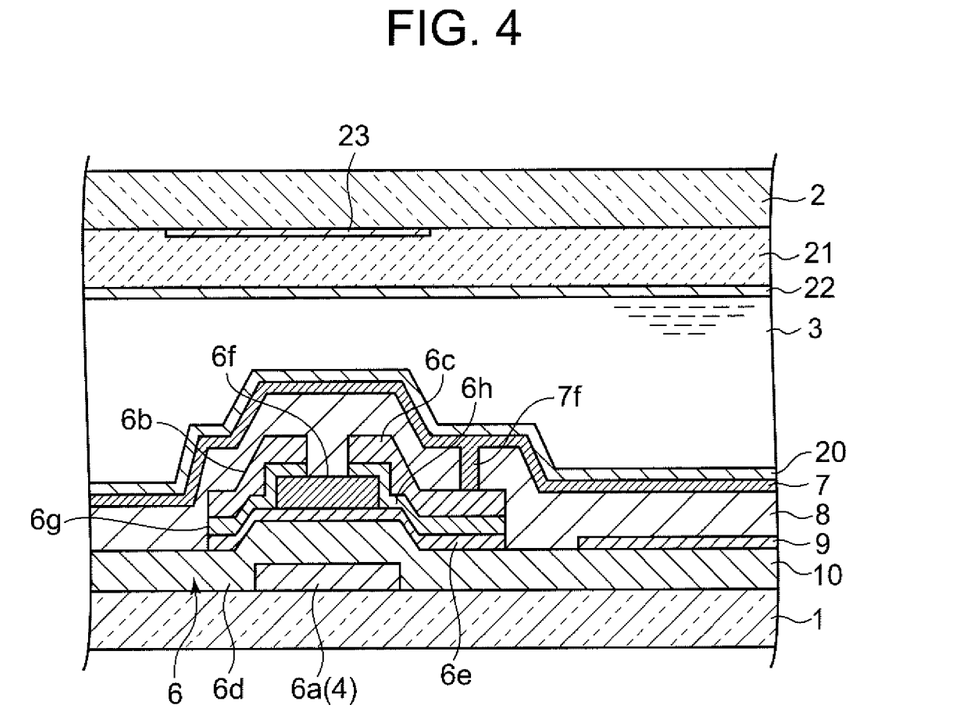
FIG. 4 is a cross-sectional view according to a variation of the liquid crystal display device of FIG. 2.

In the example shown in the figure, the common electrode 9 is formed on the interlevel insulating layer 8, and the pixel electrode 7 is formed on the lower side of the interlevel insulating layer 8. However, the vertical relation of the pixel electrode 7 and the common electrode 9 with respect to the interlevel insulating layer 8 can be reversed, with a pixel electrode 7 having the first slits, the second slit, and the third slit formed on the interlevel insulating layer, and a solid common electrode 9 on the lower side of the interlevel insulating layer 8. In this case, as shown in FIG. 4, a variation of FIG. 2, the drain electrode 6c and the pixel electrode 7 are connected with a pillar interconnect 7f.

[Second Embodiment]

Figure 5:
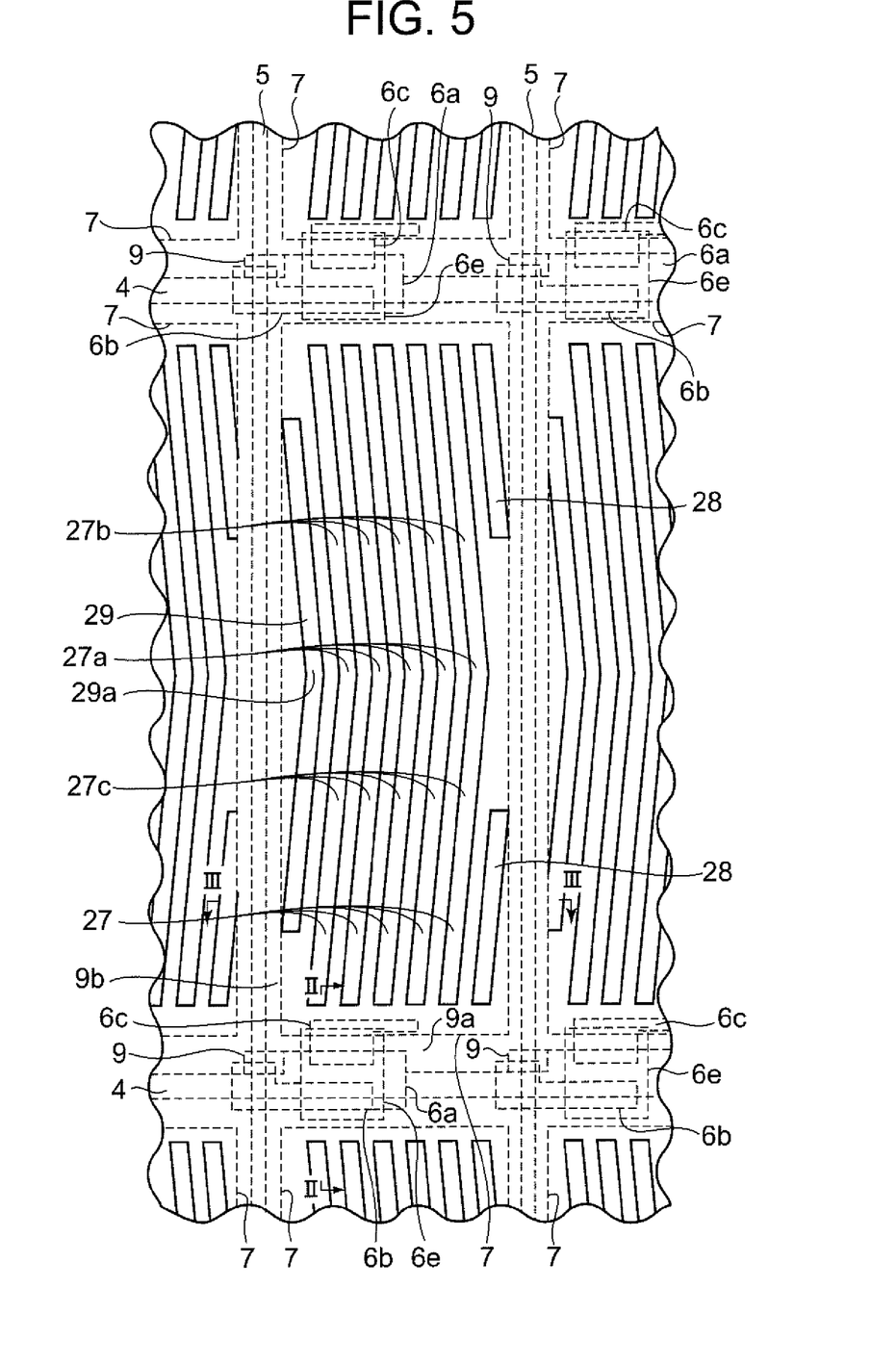
FIG. 5 is a plan view of a liquid crystal display device according to the second embodiment of the present invention.

FIG. 5 is a plan view of a liquid crystal display device according to the second embodiment of the present invention. The same reference characters are assigned to the portions identical to those in the first embodiment. The cross-sectional view taken along the line of II-II and the line III-III of FIG. 5 are the same as those shown in FIGS. 2 and 3 respectively.

The pattern of the slits on the common electrode in the second embodiment is different from that of the first embodiment. In detail, in the second embodiment, the first slits formed on the main portion 9c of the common electrode 9 extend in the column direction, forming a dog-leg shape. Namely, it differs in not having a bent portion shown in FIG. 1.

Each of the first slits 27 extends in the column direction, forming a generally dog-leg shape. The first elongated portion 27b and the second elongated portion 27c that extend in different slanting directions are connected at the bent portion 27a. In other words, the main portion 9c of the common electrode 9 has the first slits 27 that bend in the middle of the column direction, extending toward the top and the bottom at specified angles of inclination. The first slits 27 are arranged in the row direction in each unit area.

As in the first embodiment, the second slit 28 in the second embodiment is formed between the rightmost first slit 27 and the right edge of the main portion 9c. The second slit 28 is a pair of sub-slits separated from each other. One of the sub-slits 28 has the shape of a portion of each of the first slits 27, excluding the bent portion 27a but including the edge portion of the first elongated portion 27b, and is formed on the side of one of the two adjacent scanning lines 4. Other slit 28 has the shape of a portion of each of the first slits 27, excluding the bent portion 27a but including the edge portion of the second elongated portion 27c, and is formed on the side of the other of the two adjacent scanning lines 4.

As in the first embodiment, the third slit 29 is formed between the leftmost first slit 27 and the left edge of the main portion 9c. The third slit 29 has a bent portion 29a, as in the case of the bent portion 27a of the first slits 27, but does not include the edge portions of the first and the second elongated portions 27b and 27c of the first slits 27.

In the second embodiment, when a voltage is applied between the pixel electrode 7 and the common electrode 9, an electric field is generated in the horizontal direction in each gap between the first slits 27, the second slit 28 and the third slit 29 formed on the common electrode 9. This horizontal electric field causes each molecule in the liquid crystal layer 3 to rotate on the plane. Consequently, not only the molecules in the liquid crystal layer 3 on the first slits 27 but also those on the second slit 28 and the third slit 29 contribute to display, thus improving transmittance.

The pixel electrode 7 and the common electrode 9 in the second embodiment may be formed into a shape symmetrical to the one shown in FIG. 5. In this case, the second slit 28 is formed, with sub-slit separated from each other, in an area enclosed by the left data line 5, upper scanning line 4, and the leftmost first slit 27, and in an area enclosed by the left data line 5, lower scanning line 4, and the leftmost first slit 27 in the plan view. The third slit 29 is formed between the right data line 5 and the rightmost first slit 27. The second slit 28 and the third slit 29 have a pattern symmetrical to the one shown in the figure.

In the example shown in the figure, the common electrode 9 is formed on the interlevel insulating layer 8 and the pixel electrode 7 is formed under the interlevel insulating layer 8. However, as in the case of the first embodiment, this vertical relation between the pixel electrode 7 and the common electrode 9 with respect to the interlevel insulating layer 8 can be reversed, with the pixel electrode 7 having the first slits, the second slit, and the third slit formed on the interlevel insulating layer 8, and with a solid common electrode 9 under the interlevel insulating layer 8.

Both in the first and the second embodiments, each of the first slit 17 and 27 extend with the longest dimension in the column direction. The sub-slits of the second slit 18 and 28 is shorter than each of the first slits 17 and 27 respectively, extending close to each of the upper and the lower scanning lines 4 as in the case of the first slits 17 and 27, but not extending up to the bent portion 17a and 27a of the first slits 17 and 27. On the other hand, the third slit 19 and 29 does not extend close to the upper or lower end of the first slits 17 and 27. The sub-slits of the second slit 18 and 28 and the third slit 19 and 29 are thus formed in an area of the common electrode 9 where the first slits 17 and 27 are not provided to use that area effectively.

[Third Embodiment]

Figure 6:
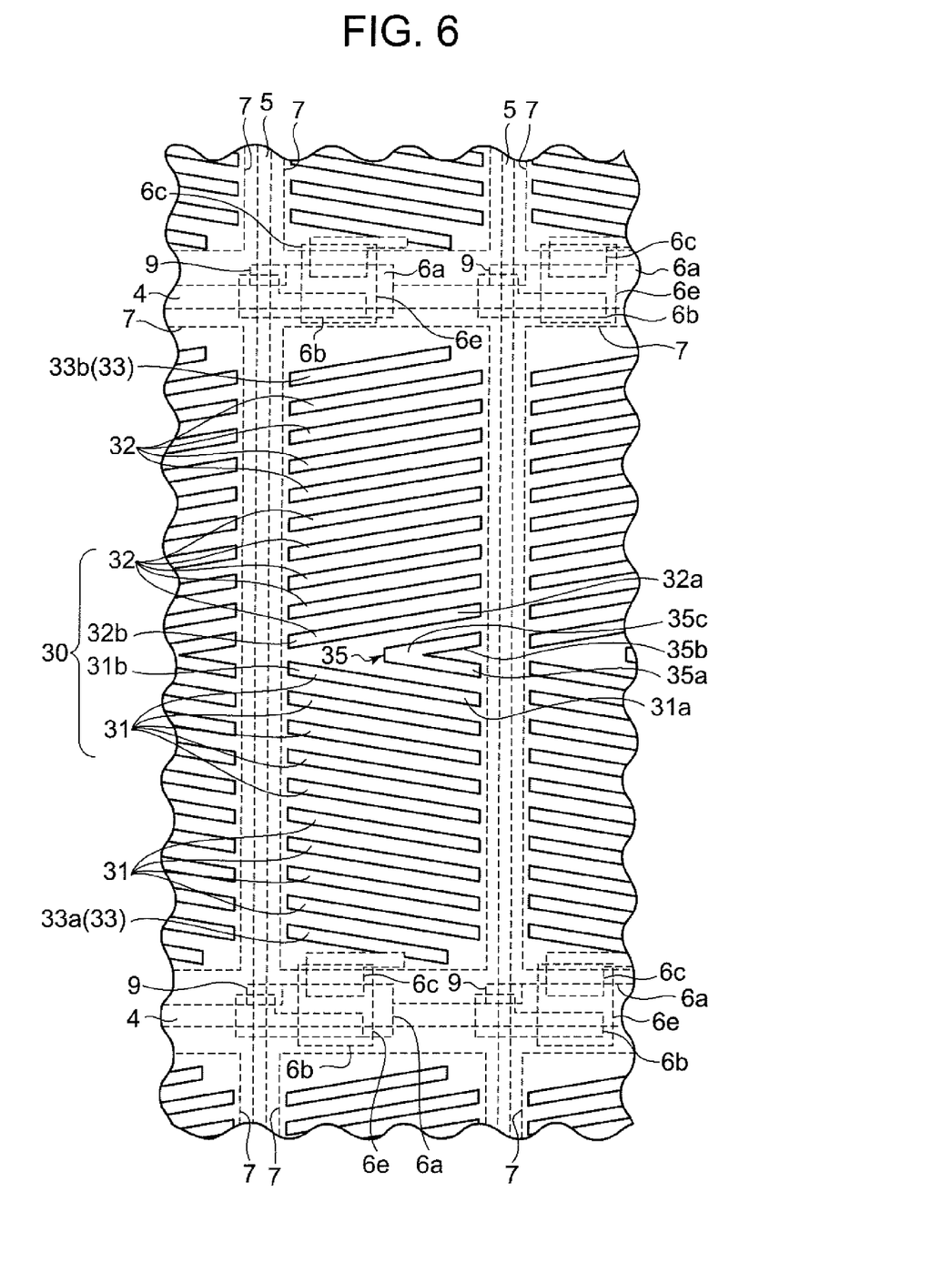
FIG. 6 is a plan view of a liquid crystal display device according to the third embodiment of the present invention.

The third embodiment of the present invention is described below. The slit pattern on the common electrode in the third embodiment is different from that of the first and the second embodiments. Description of all the other aspects, which are the same as the first and the second embodiments, will be omitted.

FIG. 6 is a plan view of a liquid crystal display device according to the third embodiment of the present invention. The same reference characters are assigned to the portions identical to those in FIGS. 1 and 5. As in the first and the second embodiments, the common electrode 9 in the third embodiment has a vertical edge portion 9a, horizontal edge portion 9b, and main portion 9c. The cross-sectional structure of the third embodiment is also approximately the same as that of the first and the second embodiments.

In the third embodiment, the first slits 30 having pairs of first openings 31 and second openings 32, a second slit 33, and a third slit 35 are formed on the main portion 9c of the common electrode 9.

With regard to the first slits, the first openings 31 and second openings 32 extend in the row direction, with the first openings 31 aligned in parallel to each other, and likewise with the second openings 32 aligned in parallel to each other, in each unit area enclosed by two adjacent scanning lines 4, that is by the lower scanning line 4 and the upper scanning line 4 in the figure shown. The edges 31a and 32a of the first openings 31 and the second openings 32 are on the side of one of the two adjacent data lines 5, on the side of the right data line 5 as shown in the figure. The other edges 31b and 32b are on the side of the other data line 5, on the side of the left data line 5 in the figure. Each of the first openings 31 extends to incline along the scanning line 4, toward upper left in the figure, with the edge 31b closer to the other scanning line, the upper scanning line 4 in the figure, than the edge 31a. Each of the second openings 32 extends to incline along the scanning line 4, toward lower left in the figure, with the edge 32a closer to the other scanning line, the upper scanning line 4 in the figure, than the edge 32b. Each of the first openings 31 is aligned sequentially along the two adjacent data lines 5. Likewise, each of the second openings 32 is aligned sequentially along the two adjacent data lines 5.

The second slit 33 has a pair of openings. One of the opening 33a is formed between the first opening 31 that is closest to one of the two adjacent scanning lines, the lower scanning line 4 in the figure shown, and the lower edge of the main portion 9c. Meanwhile, the other opening 33b is formed between the second opening 32 that is closest to the other scanning line and the upper edge of the main portion 9c. One of the subslits of the second slit 33a has the shape including a portion of the first opening 31, or the edge 31b, and excluding the edge 31a. The other subslit 33b has the shape including a portion of the second opening 32, or the edge 32b, excluding the other edge 32a.

The third slit 35 is formed between the first opening 31 that is closest to the second openings 32 of all the first openings 31 formed sequentially along the two adjacent data lines 5, and the second opening 32 that is closest to the first openings 31 of all the second openings 32 formed along the two adjacent data lines 5. The third slit 35 has two separate edges 35a and 35b on the side of one of the two adjacent data lines 5. One side of the third slit 35 extends from one of its edges 35a in parallel with the first openings 31 along the row direction, whereas the other side extends from the other edge 35b in parallel with the second openings 32 along the row direction. The opposite edge of the edge 35a are connected with the opposite edge other edge 35b at a distance from the two adjacent data lines 5. Each width of the first slits 30 is longer than that of the second slit 33 with regard to the row direction. In the example shown in the figure, a pair of the second slit 33 extends close to the left data line 5, but does not extend close to the right data line 5. The third slit 35 as shown in the figure is formed in V shape on the side of the right data line 5.

In the third embodiment also, the second slit 33 and the third slit 35 are formed in areas where first slits 30 are not formed. Consequently, a horizontal electric field is generated between the pixel electrode 7 and each of the first slits 30, the second slit 33, the third slit 35. These horizontal electric fields allow each molecule in the liquid crystal layer 3 to rotate on the plane. Therefore, not only the molecules in the liquid crystal layer 3 on the first slits 30 but also those on the second slit 33 and the third slit 35 contribute to display, thus improving transmittance.

In the third embodiment also, each of the pixel electrode 7 and the common electrode 9 may be formed into a shape symmetrical to the one shown in FIG. 6. In this case, the third slit 35 is provided in the area enclosed by the left data line 5, the first opening 31 and the second opening 32 which are oppositely disposed at the position close to the left data line 5. The second slit 33 is formed in the area enclosed by the right data line 5, bottom scanning line 4, and the first opening 31 of the first slits 30 closest to the bottom scanning line 4, and in the area enclosed by the right data line 5, top scanning line 4, and the second opening 32 of the first slits 30 closest to the top scanning line 4 respectively.

In the example shown in the figure, the common electrode 9 is formed on the interlevel insulating layer 8, and the pixel electrode 7 is formed under the interlevel insulating layer 8. However, as in the case of the first and second embodiments, this vertical relation between the pixel electrode 7 and the common electrode 9 with respect to the interlevel insulating layer 8 can also be reversed, with the pixel electrode 7 having the first slits, the second slit, and the third slit formed on the interlevel insulating layer 8, and a solid common electrode 9 under the interlevel insulating layer 8.

Several embodiments have been described. The opening pattern of the pixel electrode 7, the number of the first slits in particular, is not limited to those shown in the figures. The opening pattern can be determined, for example, according to the distance between adjacent scanning lines 4 or between adjacent data lines 5.

For example, in the embodiment shown in FIG. 1, the pixel electrode may be formed to protrude over the bottom scanning line 4.

What is claimed is:
1. A liquid crystal display device comprising:
a liquid crystal layer provided between a first substrate and a second substrate;
first electrodes, which are formed above the first substrate as a first layer, each first electrode having a side which extends in the direction in parallel with the extending direction of data lines, each first electrode electrically connected to corresponding data line via corresponding switching device; and
a second electrode, which is formed above the first substrate as a second layer, having a first slit and a second slit in each part of the area overlapping with corresponding first electrode;
wherein the first slit has a first elongated portion extending in a direction inclining toward the extending direction of the side at a given angle, a second elongated portion extending in a direction inclining toward the extending direction of the side at an angle symmetrical to the given angle with respect to the first elongated portion, and a bent portion that connects the first elongated portion with the second elongated portion; and
the second slit has a third elongated portion which is formed in parallel with the first elongated portion, and a fourth elongated portion which is formed in parallel with the second elongated portion and separated from the third elongated portion.

2. The liquid crystal display device as set forth in claim 1, wherein other slits having the same shape as the first slit are formed on the second electrode in parallel to the first slit.

3. The liquid crystal display device as set forth in claim 2, wherein the other slits having the same shape as the first slit are formed in an area overlapping with the first electrode.

4. The liquid crystal display device as set forth in claim 2, wherein the other slits having the same shape as the first slit are formed on the side opposite to the side on which the second slit is formed.

5. The liquid crystal display device as set forth in claim 1, comprising scanning lines which extend in the direction orthogonal to the data lines, each scanning line connected to the corresponding switching device, wherein the first slit has the first elongated portion closer to corresponding scanning line than the second elongated portion thereof.

6. The liquid crystal display device as set forth in claim 1, comprising scanning lines which extend in the direction orthogonal to the data lines, each scanning line connected to the corresponding switching device, wherein each second slit has the third elongated portion formed closer to the corresponding scanning line than the fourth elongated portion thereof.

7. The liquid crystal display device as set forth in claim 1, wherein each first electrode is not overlapped with corresponding data line.

8. The liquid crystal display device as set forth in claim 1, wherein an insulating film is provided between the first layer and the second layer as a third layer, and the first electrodes and the second electrode are electrically insulated from each other.

9. The liquid crystal display device as set forth in claim 1, wherein the second layer is formed closer to the liquid crystal layer than the first layer.

10. The liquid crystal display device as set forth in claim 1, wherein the first and second electrode is made of indium tin oxide.

11. The liquid crystal display device as set forth in claim 1, wherein each of first electrode is formed in corresponding display pixel.

12. The liquid crystal display device as set forth in claim 1, wherein the first elongated portion has the same length as the second elongated portion.

13. The liquid crystal display device as set forth in claim 1, wherein the third elongated portion has the same length as the fourth elongated portion.

14. The liquid crystal display device as set forth in claim 1, wherein the first elongated portion of each of the first slit is longer than the third elongated portion of the second slit.

15. The liquid crystal display device as set forth in claim 1, wherein the first elongated portion, the bent portion, and the second elongated portion are serially connected.

16. The liquid crystal display device as set forth in claim 1, wherein control of voltage that is applied between each of the first electrode and the second electrode leads to a change in alignment direction of each of the liquid crystal molecules in the liquid crystal layer.

17. A liquid crystal display device comprising:
a liquid crystal layer provided between a first substrate and a second substrate;
pixel electrodes, which are formed above the first substrate as a first layer, each pixel electrode having a side which extends in the direction in parallel with the extending direction of data lines, each pixel electrode electrically connected to corresponding data line via corresponding thin film transistor; and
a common electrode, which is formed above the first substrate as a second layer, having a first slit and a second slit in each part of the area overlapping with corresponding pixel electrode;
wherein the first slit has a first elongated portion extending in a direction inclining toward the extending direction of the side at a given angle, a second elongated portion extending in a direction inclining toward the extending direction of the side at an angle symmetrical to the given angle with respect to the first elongated portion, and a bent portion that connects the first elongated portion with the second elongated portion; and
the second slit has a third elongated portion which is formed in parallel with the first elongated portion, and a fourth elongated portion which is formed in parallel with the second elongated portion and separated from the third elongated portion.

18. A liquid crystal display device comprising:
a liquid crystal layer provided between a first substrate and a second substrate,
first electrodes, which are formed above the first substrate as a first layer, each first electrode having a side which extends in the direction in parallel with the extending direction of data lines, each first electrode electrically connected to corresponding data line via corresponding switching device; and
a second electrode, which is formed above the first substrate as a second layer, having a first slit, a second slit, and a third slit in each part of the area overlapping with corresponding first electrode,
wherein the first slit has a first elongated portion extending in a direction inclining toward the extending direction of the side at a given angle, a second elongated portion extending in a direction inclining toward the extending direction of the side at an angle symmetrical to the given angle with respect to the first elongated portion, and a first bent portion that connects the first elongated portion with the second elongated portion; and
the second slit has a third elongated portion, which is formed in parallel with the first elongated portion and is shorter than the first elongated portion, and a fourth elongated portion, which is formed in parallel with the second elongated portion and is shorter than the second elongated portion, the fourth elongated portion separated from the third elongated portion; and
the third slit has a fifth elongated portion, which is formed in parallel with the first elongated portion and is shorter than the first elongated portion, a sixth elongated portion, which is formed in parallel with the second elongated portion and is shorter than the second elongated portion, and a second bent portion that connects the fifth elongated portion with the sixth elongated portion.

19. The liquid crystal display device as set forth in claim 18, wherein the first slit is interposed between the second slit and the third slit.

20. The liquid crystal display device as set forth in claim 18, comprising scanning lines which extend in the direction orthogonal to the data lines, each scanning line connected to the corresponding switching device, wherein each of the third slit has the fifth elongated portion closer to the corresponding scanning line than the sixth elongated portion thereof.

* * * * *